Aug. 18, 1970     J. L. WILLIAMS     3,524,742

PROCESS FOR REFINING STEEL

Filed July 5, 1967     2 Sheets-Sheet 1

INVENTOR.
JACKSON L. WILLIAMS
BY

United States Patent Office 3,524,742
Patented Aug. 18, 1970

3,524,742
PROCESS FOR REFINING STEEL
Jackson L. Williams, 3845 Orleans Road,
Birmingham, Ala. 35213
Filed July 5, 1967, Ser. No. 673,525
Int. Cl. C21c 5/32
U.S. Cl. 75—51                                    10 Claims

ABSTRACT OF THE DISCLOSURE

Silicon carbide is used as an auxiliary fuel in the oxygen-converter process for refining steel. The silicon carbide is added in the ratio of 1 part of silicon carbide for about every 10 to 15 parts of ferrous scrap in excess of the parts of ferrous scrap normally required to maintain the process in thermal balance. The silicon carbide is charged to the converter after the ferrous scrap and before the hot metal. In the upright oxygen-converter process the metallic charge consists of hot metal and up to about 50% ferrous scrap.

---

Figure 1:
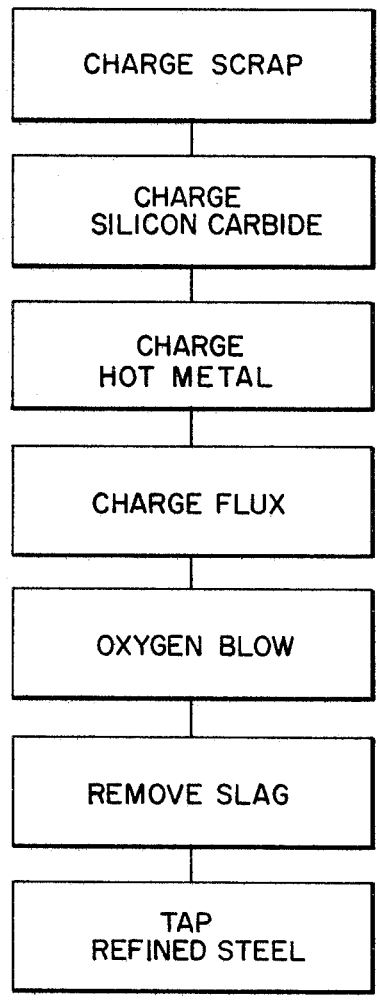

This invention relates to a process for the production of steel by means of directing a jet of oxygen-containing gas onto the surface of a bath of molten material. More particularly this invention relates to a process for the production of steel by the oxygen-converter process wherein a predetermined quantity of auxiliary fuel is added to the furnace charge along with the other constituents which normally comprise the charge.

In the processing of steel it is necessary to refine the pig iron from the blast furnaces in order to lower the carbon content to a desired level and to bring to an acceptable level, or remove altogether, various other elements contained in the pig iron. Most pig iron, which comprises the hot metal of the furnace charge, normally includes the following elements, in addition to iron:

|  | Percent |
|---|---|
| Carbon | 3.50–4.50 |
| Silicon | 0.50–1.50 |
| Manganese | 0.50–1.50 |
| Sulfur | 0.03–0.05 |
| Phosphorous | 0.10–0.30 |

The refining process may be carried out by any of four general processes: i.e., Bessemer Process, Open Hearth Process (basic or acid), Electric Furnace Process and the Oxygen-Converter Process, the chemistry of which processes is well-known by those skilled in the art. At present the Open Hearth Process is most widely used by the steelmaking industry for refining pig iron into steel. In the past few years, however, the oxygen-converter process has become increasingly used in steel production and promises to become the most widely used process for the refining of steel.

The prime features of the oxygen-converter process are that it is fast, readily controlled and requires no external heat source to carry out the process. The converter is normally charged with hot metal, steel scrap and flux. The heat for the process is supplied by the sensible heat of the hot metal and by exothermic reactions between oxygen and iron and other elements present in the charge. The oxygen-converter process may be divided into two broad categories: (1) those processes in which the converter is in an upright position and remains stationary during the refining process, and (2) those in which the converter is in a horizontal or inclined position and rotates during refining. The amount of scrap used in the charge normally ranges from 30% of the total metallic charge in the upright process to about 45% of the total metallic charge in the rotary process.

It can be seen that the oxygen-converter process is inherently a large consumer of hot metal since a significant amount of the thermal energy used in the process comes from the sensible heat of the hot metal. In many cases it is advantageous to increase the percentage of scrap in metallic charge. Such a case would be when the price of scrap is low and thus the use of more scrap would provide an economic source of iron. In many instances the oxygen-converter process is capable of using more hot metal than can be provided by the available blast furnace facilities. In such situations it would be desirable to decrease the amount of hot metal used in the converter charge and thus bring the hot metal usage within the capabilities of the existing blast furnace facilities. The obvious alternatives, of course, are to operate the converters part time so as not to exceed hot metal production capabilities, or, to build additional hot metal facilities, both of which are obviously expensive alternatives. A third alternative is to use electric furnaces to convert scrap into hot metal. This alternative is not only expensive but the hot metal produced is undesirable since it is low in oxidizable elements, which when oxidized provide a source of thermal energy for the steel refining process.

A more economical approach to decreased hot metal usage is to increase the ratio of scrap to hot metal by the use of an auxiliary fuel which would allow for the use of additional scrap in the converter charge. In this connection the steel industry has been experimenting with the use of calcium carbide as an auxiliary fuel. By use of calcium carbide the percent of scrap in the total metallic charge of an upright converter has been raised from about 30% to about 50%. Calcium carbide, however, has several disadvantages which make its use as an auxiliary fuel in the oxygen-converter process undesirable. The addition of calcium carbide tends to obscure the end point of the heat, which is normally marked by a substantially abrupt dying out of the flame given off from the charge during the refining process. Moreover unreacted calcium carbide tends to gather at the bottom of the converter and continues to cause gassing and foaming even after the end point of the heat has occurred. Furthermore approximately 1 pound of calcium carbide is required to melt 5 pounds of additional scrap. Calcium carbide also requires special handling in order to keep it dry since contact between calcium carbide and moisture causes the generation of acetylene and calcium hydroxide, both of which reaction products are dangerous and undesirable in the storage area. It has also been found that with the use of calcium carbide on low carbon heats can be produced, i.e. heats containing less than 0.1% carbon.

Accordingly it is an object of this invention to provide an improved oxygen-converter process for refining steel whereby the amount of hot metal required in the charge is reduced and the percentage of scrap therein is substantially increased.

It is a further object of this invention to provide an additive which is inert and safe to handle.

It is a further object of this invention to provide an additive which will melt an increased amount of scrap per pound of additive as compared with calcium carbide.

Further objects and advantages of this invention will be apparent from the following detailed description and drawings and the novel features thereof will be particularly pointed out in connection with the appended claims.

The process of this invention comprises in general charging a converter or suitable vessel with ferrous scrap, hot metal and flux and, in addition, a desired amount of silicon carbide as an auxiliary fuel, directing a jet of oxygen-containing gas onto said charge to provide sufficient oxygen to refine the metal of said charge and separating refined metal from slag.

In the oxygen-converter process there is no outside source of thermal energy to aid in carrying out the refining process. Heat is provided by the sensible heat of the hot metal charged and the exothermic reactions between impurities in the charge and oxygen. It is also the reactions between the impurities and oxygen that cause the refining since the oxidized impurities are either passed off as gas or separated from the metal in the form of lighter oxides that form a slag on the surface of the molten charge. It can be seen from this that it is very important to maintain the proper heat balance in order to prevent the temperature from becoming excessive, whereby the bath temperature would become intolerable, or insufficient, whereby there would not be enough heat generated to carry out the refining process. To maintain proper heat balance it is common practice to add to the converter charge a coolant such as iron ore or ferrous scrap. Scrap is preferred since the resultant yield of ingot is higher than when iron ore is used. In the upright oxygen-converter process between about 20% and 30% of the metallic charge consists of steel scrap.

The term ferrous scrap as used herein includes all types and grades of ferrous scrap such as carbon steel, alloy steel, stainless steel and many types of cast iron. The most commonly used scrap, however, is that material generated within the steel plant, such as, for example, trimmings, croppings, turnings, rejects and other iron and steel that cannot be converted into useful end products without extensive reprocessing.

The remaining 70% to 80% of the metallic charge consists of hot metal and it is the sensible heat of the hot metal that begins to melt the scrap. Table A below shows the heat balances in an upright oxygen-converter using both 20% and 30% steel scrap as a coolant.

TABLE A.—HEAT BALANCES IN AN UPRIGHT OXYGEN-CONVERTER

|  | 10⁶ B.t.u. per net ingot ton | |
|---|---|---|
|  | 80% hot metal, 20% scrap | 70% hot metal, 30% scrap |
| Input: |  |  |
| Sensible heat in hot metal | 0.985 | 0.855 |
| Exothermic reactions | 0.907 | 0.787 |
| Total | 1.892 | 1.642 |
| Output: |  |  |
| Sensible heat in liquid steel | 1.247 | 1.247 |
| Sensible heat in slag and shot | 0.241 | 0.213 |
| Sensible heat in off gas | 0.141 | 0.123 |
| Sensible heat in dust | 0.031 | 0.029 |
| Radiation loss | 0.030 | 0.030 |
| Total | 1.690 | 1.642 |
| To balance | +0.202 | |

It can be seen from Table A that when 20% scrap is used that there are some 202,000 B.t.u. of excess heat and the process is not in balance, while with 30% scrap the heat input and output are balanced. It can also be seen that if 35% or 40% of scrap were used additional heat would have to be supplied during refining in order to maintain proper heat balance necessary for the oxygen-converter process. In order to increase the amount of scrap used it is therefore necessary to provide an additional source of thermal energy in order to maintain heat balance during the refining process.

It has been found that silicon carbide acts as an auxiliary fuel in the oxygen-converter process to provide additional heat to the refining process. It has also been found that scrap rates in excess of 30% may be used in the metallic charge. In field tests scrap rates on the order of 50% of the metallic charge have been successfully used and as operators become more familiar with the use of silicon carbide as an auxiliary fuel scrap rates in excess of 50% may be used.

Silicon carbide acts an as auxiliary fuel through its exothermic reaction with oxygen. This reaction along with the heats of reaction are as follows:

298° K.:

| | |
|---|---|
| $SiC \rightarrow Si+C$, | $\Delta H = +26.7$ kcal. |
| $Si+O_2 \rightarrow SiO_2$, | $\Delta H = -205$ kcal. |
| $C+\frac{1}{2}O_2 \rightarrow CO$, | $\Delta H = -26.4$ kcal. |
| $SiC+\frac{3}{2}O_2 \rightarrow SiO_2+CO$, | $\Delta H = -204.7$ kcal. |

The amount of thermal energy provided per pound of silicon carbide has been calculated as 7880 B.t.u./lb. SiC. This compares favorably with the thermal energy provided by calcium carbide which has been calculated as 4060 B.t.u./lb. of $CaC_2$. In terms of proportions of scrap to silicon carbide it has been found that best results are achieved when the ratio of pounds of scrap in excess of 30% of the metallic charge to pounds of silicon carbide is maintained at not less than 10:1 and preferably 15:1 or higher.

The silicon carbide used as an auxiliary fuel in this invention may be of any suitable commercial grade and impurities contained in the silicon carbide have not been found to have any detrimental effect on the oxygen-converter refining process. However, the lower the purity of the silicon carbide the greater number of pounds of silicon carbide-containing material required to maintain the ratio of scrap to silicon carbide at the desired level. It is preferred, therefore, to use high purity silicon carbide since the total pounds of silicon carbide containing material is kept at a minimum. Thus, while material containing 80% to 90% silicon carbide is quite satisfactory it is preferred that material having a silicon carbide content of 96% or higher be used in the process of this invention.

No special handling of silicon carbide is required since it is a relatively inert material. Particle size is not critical to the efficiency of silicon carbide as an auxiliary fuel except that if the material contains a high percentage of fines there may be losses of material due to the formation of dust. Silicon carbide having particle sizes of ⅜ in. and finer, 8 mesh and finer, and 20 mesh and finer has been used with equal success. The silicon carbide may be charged into the converter in bags or in bulk. In addition the silicon carbide may be mixed with a suitable temporary binder and shaped in forms such as briquettes, rods, bars, tubes and the like and charged to the converter in such forms. Bulk charging is preferred, however, as it is simpler, less costly and faster. When used in bulk, however, coarser grades of silicon carbide are preferred to avoid losses of material through cracks in the storage equipment and handling equipment and to avoid material loss due to dust.

Referring to the drawings, FIG. 1 shows in the form of a flow diagram the steps involved in carrying out a typical steel refining cycle according to this invention.

Figure 2:
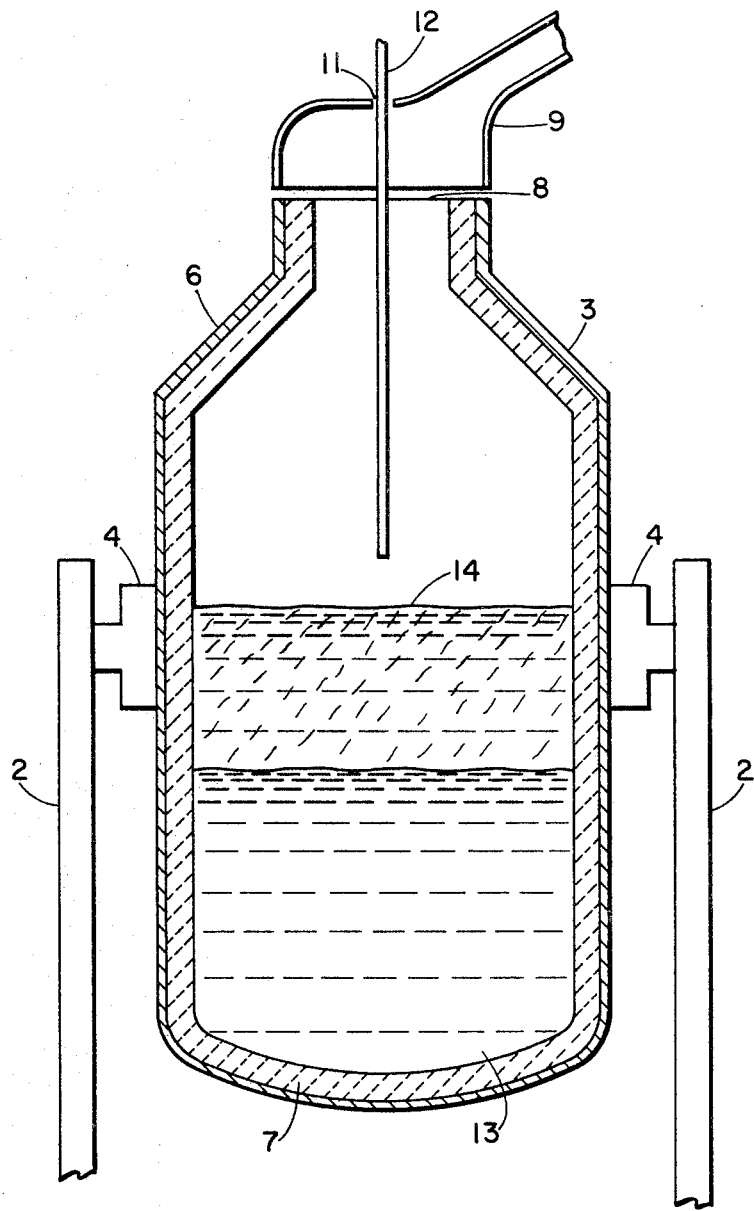

FIG. 2 shows a typical upright oxygen-converter in section.

As shown in FIG. 2 the converter vessel 3 is mounted on suitable supporting members 2 by mounting means 4 in such a manner that vessel 3 can be tilted from its normally upright position. Vessel 3 comprises an outer steel shell 6 and a suitable inner refractory lining 7 and is open at one end to form mouth 8. In its normal upright position mouth 8 of vessel 3 is aligned with dust collecting hood 9. Opening 11 is provided in the top of hood 9 through which oxygen lance 12 is vertically inserted and withdrawn.

In carrying out the process according to this invention the sequence of charging of materials to the converter is important in order to insure complete reaction of the silicon carbide and to avoid undesirable flare-ups after meltdown. FIG. 1 shows the preferred sequence of steps for carrying out the process according to this invention.

To begin the process oxygen lance 12 is withdrawn from the interior of converter vessel 3. Vessel 3 is tilted so that mouth 8 is positioned for the charging of the scrap. After the scrap is charged, a suitable amount of silicon carbide-containing material is added and mouth 8 is repositioned for receiving the hot metal. Finally the addition of a suitable flux, normally calcium oxide, completes the charging operation and vessel 3 is tilted back to its normally upright position with mouth 8 aligned with dust collecting hood 9. Oxygen lance 12 is lowered through opening 11 in dust collecting hood 9 and a jet of oxygen-containing gas is conducted therethrough and directed onto or into the surface of molten metal. This step, referred to as blowing, is accompanied by a substantial amount of flamming which marks the oxidation of carbon to carbon monoxide. The carbon content of the molten charge is reduced to about 0.8% to about 0.05% C. The end point of the blowing operation is marked by a change in the character and quantity of the flame. This normally occurs after from about 15 to 30 minutes of blowing. During blowing the silicon carbide is converted to $SiO_2$ and C with the liberation of heat. The additional heat thus formed is utilized in the melting of scrap and oxidizing impurities in the charge. The heat balance of the process is thus maintained. The excess carbon of the silicon carbide is removed along with the carbon of the hot metal while the silicon forms $SiO_2$ and goes into the slag where it forms a silicate complex with the CaO and FeO of the slag.

At the completion of blowing the silicon carbide has been substantially completely consumed. The bath then comprises slag 14 and molten steel 13. The jet of oxygen-containing gas is turned off and lance 12 is withdrawn from converter vessel 3. Converter vessel 3 may then be tilted for the removal of slag 14 and tapping of molten steel 13.

The following example illustrates the use of silicon carbide as an auxiliary fuel in an oxygen-converter process for refining steel using an upright converter.

EXAMPLE

In an oxygen-converter process carried out in the manner described above, said process being 85% efficient, the following illustrates a method for calculating the proportion of silicon carbide required using a scrap rate of 50% to produce 2000 lbs. of steel.

| | Pounds |
|---|---|
| Hot metal | 1175 |
| Scrap | 1175 |
| Total metallic charge | 2350 |
| Normal 30% scrap charge | 700 |
| Excess scrap | 475 |
| SiC (15 lbs. scrap/lb. of SiC) | 31.7 |

The above proportions of silicon carbide are based on 100% pure material. When silicon carbide-containing materials contain other impurities the above proportion should be adjusted. For example, one type of silicon carbide-containing material which has been used as an auxiliary fuel is a material identified as Ferrocarbo®, a trademark of The Carborundum Company. This material has a typical analysis as follows:

| | Percent |
|---|---|
| SiC | 88.7 |
| Free carbon | 3.26 |
| $Si+SiO_2$ | 5.48 |
| Sulfur | 0.13 |

With such a material, in order to introduce 31.7 lbs. of SiC per ton of steel, it would be necessary to use approximately 36 lbs. of Ferrocarbo® silicon carbide containing material.

Although the above discussions and example are directed towards reducing hot metal usage and increasing the scrap rate of oxygen-converter processes using upright converters it should be clear that this invention is equally applicable to rotary oxygen-converter processes and to other modifications of the oxygen-converter process.

It will be understood that the present invention is not limited to the specific materials, steps and other specific details described above and may be carried out with various modifications without departing from the scope of the invention as defined in the appended claims.

I claim:

1. In a process for refining steel which comprises directing a stream of oxygen-containing gas into contact with a bath containing molten impure iron, ferrous scrap and flux whereby said oxygen of said gas exothermally reacts with said impurities, the improvement which comprises the addition, after charging the ferrous scrap and before charging the hot metal, of a silicon carbide containing material in an amount of 1 part silicon carbide for at least every 10 parts of ferrous scrap in excess of the amount of scrap required to keep said process thermally balanced, the amount of ferrous scrap being more than 30% by weight of the total metallic charge.

2. The process as defined in claim 1 wherein said bath is formed by charging a vessel with ferrous scrap, silicon carbide-containing material, molten impure iron and flux, in that order.

3. The process as defined in claim 2 wherein said silicon carbide-containing material comprises at least 86% by weight silicon carbide.

4. The process as defined in claim 3 wherein said silicon carbide-containing material comprises at least 96% by weight silicon carbide.

5. The process as defined in claim 2 wherein said silicon carbide-containing material is charged to said vessel in bulk form.

6. The process as defined in claim 2 wherein said silicon carbide-containing material is mixed with a temporary binder and shaped into briquettes, rods, bars or tubes and charged to said vessel.

7. The process as defined in claim 5 wherein said silicon carbide-containing material has a particle size of about 10 mm. and finer.

8. The process of claim 2 wherein said ferrous scrap of said bath comprises about 50% by weight of the total metallic charge.

9. The process of claim 2 wherein said silicon carbide is added in proportions equivalent to 1 part silicon carbide for at least every 10 parts of said ferrous scrap in excess of 30% of said scrap.

10. The process of claim 2 wherein said silicon carbide is added in proportions equivalent to 1 part silicon carbide for at least every 15 parts of said ferrous scrap in excess of 30% of said scrap.

References Cited

UNITED STATES PATENTS

| 2,497,745 | 2/1950 | Stohr | 75—44 |
| 2,865,735 | 12/1958 | Timmerbeil et al. | 75—55 |
| 3,051,564 | 8/1962 | Drenning | 75—53 |
| 3,218,157 | 11/1965 | Dobrosky | 75—51 X |
| 3,262,772 | 7/1966 | Richter et al. | 75—60 X |
| 3,350,196 | 10/1967 | Bashford | 75—52 |

L. DEWAYNE RUTLEDGE, Primary Examiner

G. K. WHITE, Assistant Examiner

U.S. Cl. X.R.

75—57, 58, 60

UNITED STATES PATENT OFFICE
CERTIFICATE OF CORRECTION

Patent No. 3,524,742     Dated August 18, 1970

Inventor(s) Jackson L. Williams

It is certified that error appears in the above-identified patent and that said Letters Patent are hereby corrected as shown below:

Column 2, line 28, "By use" should read -- By the use --. Column 6, line 30, after "at least 86%" insert -- by weight silicon carbide. --; line 31, "claim 3" should read -- claim 2 --.

Signed and sealed this 24th day of November 1970.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,524,742                                          August 18, 1970

Jackson L. Williams

It is certified that error appears in the above identified patent and that said Letters Patent are hereby corrected as shown below:

Column 1, in the heading, the following should appear:

Application filed by The Carborundum Company, Niagara Falls, New Yrok, a corporation of Delaware, under Rule 47(b).

Signed and sealed this 30th day of March 1971.

(SEAL)
Attest:

EDWARD M. FLETCHER, JR.                          WILLIAM E. SCHUYLER, JR.
Attesting Officer                                        Commissioner of Patents